US012711805B2

(12) United States Patent
Andrews et al.

(10) Patent No.: US 12,711,805 B2
(45) Date of Patent: Aug. 18, 2026

(54) ETHICAL HUMAN-CENTRIC IMAGE DATASET

(71) Applicant: Sony Group Corporation, Tokyo (JP)

(72) Inventors: Jerone Andrews, Tokyo (JP); Alice Xiang, Seattle, WA (US)

(73) Assignee: SONY GROUP CORPORATION, Tokyo (JP)

( * ) Notice: Subject to any disclaimer, the term of this patent is extended or adjusted under 35 U.S.C. 154(b) by 344 days.

(21) Appl. No.: 18/449,192

(22) Filed: Aug. 14, 2023

(65) Prior Publication Data

US 2024/0078839 A1 Mar. 7, 2024

Related U.S. Application Data

(60) Provisional application No. 63/374,325, filed on Sep. 1, 2022.

(51) Int. Cl.
*G06V 40/16* (2022.01)
*G06F 3/04845* (2022.01)
(Continued)

(52) U.S. Cl.
CPC ........ *G06V 40/171* (2022.01); *G06F 3/04845* (2013.01); *G06T 7/70* (2017.01);
(Continued)

(58) Field of Classification Search
CPC ...... G06V 40/171; G06V 10/25; G06V 20/70; G06V 40/172; G06V 10/7747;
(Continued)

(56) References Cited

U.S. PATENT DOCUMENTS 8,812,519 B1 * 8/2014 Bent ..................... G06F 16/532
707/723
9,971,942 B2 * 5/2018 Fan ..................... G06F 18/2415
(Continued)

FOREIGN PATENT DOCUMENTS

CN 116883530 A 10/2023
CN 118840643 A 10/2024
WO WO-2022038440 A1 2/2022

OTHER PUBLICATIONS

Eduard Poesina, et al, "PQPP: A Joint Benchmark for Text-to-Image Prompt and Query Performance Prediction", arXiv:2406.04746v1 [cs.CV], Jun. 7, 2024, pp. 1-20.
(Continued)

*Primary Examiner* — Wesley J Tucker
(74) *Attorney, Agent, or Firm* — INNOVATION CAPITAL LAW GROUP, LLP; Vic Lin

(57) ABSTRACT

A diverse dataset of human images can be created by collecting a plurality of images from a plurality of diverse people. A first graphical user interface requires a user to provide subject data, instrument data and environment data as metadata for each of the plurality of images. A second graphical user interface requires a user to form a bounding box about a face of a subject in each of the plurality of images. A third graphical user interface requires annotators to provide annotations for each of the plurality of images. The dataset may be used for training or evaluating machine learning or artificial intelligence systems, such as systems for body and face detection, body and face landmark detection, body and face parsing, face alignment, face recognition, face verification, image editing and image synthesis.

20 Claims, 2 Drawing Sheets

(51) Int. Cl.
*G06T 7/70* (2017.01)
*G06V 10/25* (2022.01)
*G06V 20/70* (2022.01)

(52) U.S. Cl.
CPC .............. *G06V 10/25* (2022.01); *G06V 20/70* (2022.01); *G06V 40/172* (2022.01); *G06T 2207/20081* (2013.01); *G06T 2207/30201* (2013.01)

(58) Field of Classification Search
CPC ..... G06V 10/772; G06F 3/04845; G06T 7/70; G06T 2207/20081; G06T 2207/30201
See application file for complete search history.

(56) References Cited

U.S. PATENT DOCUMENTS

| | | | | |
|---|---|---|---|---|
| 10,842,415 | B1 * | 11/2020 | Jagannathan | G06N 3/08 |
| 11,232,511 | B1 * | 1/2022 | Zehr | G06Q 30/0643 |
| 11,604,827 | B2 * | 3/2023 | Nasir | G06V 10/82 |
| 12,573,183 | B2 * | 3/2026 | Xiang | G06V 10/7753 |
| 2008/0112621 | A1 * | 5/2008 | Gallagher | G06V 40/172 382/190 |
| 2009/0185723 | A1 * | 7/2009 | Kurtz | G06V 40/50 382/118 |
| 2013/0121584 | A1 * | 5/2013 | Bourdev | G06V 40/171 382/218 |
| 2013/0129231 | A1 * | 5/2013 | Dale | G06F 18/41 382/224 |
| 2014/0040828 | A1 * | 2/2014 | Choi | G06F 3/04883 715/835 |
| 2015/0199560 | A1 * | 7/2015 | Gokturk | G06V 10/772 382/195 |
| 2016/0283483 | A1 * | 9/2016 | Jiang | G06F 16/2246 |
| 2019/0114487 | A1 * | 4/2019 | Vijayanarasimhan | G06V 20/30 |
| 2021/0264373 | A1 | 8/2021 | Garg et al. | |
| 2022/0101146 | A1 * | 3/2022 | el Kaliouby | G06N 3/08 |
| 2022/0207260 | A1 * | 6/2022 | Dong | G06V 10/82 |
| 2022/0270352 | A1 * | 8/2022 | Zhang | G06V 10/776 |
| 2023/0153387 | A1 * | 5/2023 | Li | G06V 10/25 382/103 |
| 2023/0245495 | A1 * | 8/2023 | Ninh | G06V 40/168 382/118 |
| 2023/0343075 | A1 * | 10/2023 | Xiang | G06V 10/7753 |
| 2025/0265812 | A1 * | 8/2025 | Hansson | G06V 10/764 |

OTHER PUBLICATIONS

Sixian Zhang, et al, “Learning Multi-Dimensional Human Preference for Text-to-Image Generation”, arXiv:2405.14705v1 [cs.CV], May 23, 2024, pp. 1-10.

Jo et al., “Lessons from Archives: Strategies for Collecting Sociocultural Data in Machine Learning”, In Proceedings of the 2020 Conference on Fairness, Accountability, and Transparency (FAT* ’20). Association for Computing Machinery, New York, NY, USA, pp. 306-316. https://doi.org/10.1145/3351095.3372829.

Pena, Alejandro et al., “Bias in Multimodal AI: Testbed for Fair Automatic Recruitment”, Proceedings of the IEEE/CVF Conference on Computer Vision and Pattern Recognition (CVPR) Workshops, 2020, pp. 1-9.

* cited by examiner

ETHICAL HUMAN-CENTRIC IMAGE DATASET

CROSS-REFERENCE TO RELATED APPLICATIONS

This application claims the benefit of priority of U.S. provisional patent application 63/374,325, filed Sep. 1, 2022, the contents of which are herein incorporated by reference.

BACKGROUND OF THE INVENTION

1. Field of the Invention

Embodiments of the invention relate generally to systems and methods of collecting a dataset to provide a general-purpose consensual human-centric image dataset of human bodies, which must include the head. The obtained dataset can be used to perform a variety of human-centric tasks, e.g., for training and evaluating commercial machine learning (ML) and artificial intelligence (AI) systems in unconstrained settings.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In unconstrained settings, factors related to the subject (e.g., demographic information), instrument (e.g., camera hardware and software), and environment (e.g., illumination, camera distance) cannot be controlled.

Therefore, there is a need to collect a dataset of human-centric images that is as diverse as possible in terms of these three factors, where all annotated persons have given their written informed consent.

SUMMARY OF THE INVENTION

Aspects of the present invention provide apparatus and methods to implement techniques for image datasets and collection. In one implementation, a dataset is constructed using multiple images, including images of humans. The collection, processing, storing and configuration of the dataset is managed to provide desired characteristics reflecting targeted specifications, criteria and metrics, such as to represent ethical goals.

Features provided in implementations can include, but are not limited to, one or more of the following items: (1) collecting images and image data including human bodies; (2) collecting and creating data related to the image data, such as information about demographics, physical characteristics, actions, poses, environment, instrument; (3) managing the data collection based on data specifications; (4) accept and manage annotation of data provided by users, vendors, and automatic generation; and (5) collecting and managing consent information for the people shown in the images.

As used herein, the term "AI" refers to any functionality or its enabling technology that performs information processing for various purposes that people perceive as intelligent, and that is embodied by ML based on data, or by rules or knowledge extracted in some methods.

Embodiments of the present invention provide a computer-implemented method for constructing a dataset of human images comprising collecting a plurality of images from a plurality of diverse people; providing a first graphical user interface requiring a user to provide subject data, instrument data and environment data as metadata for each of the plurality of images; and storing the plurality of images as the dataset, wherein the subject data includes demographic information, physical characteristics, actions and head pose.

Embodiments of the present invention provide a computer-implemented method for training or evaluating commercial machine learning or artificial intelligence systems in an unconstrained setting comprising creating a diverse dataset of human images by collecting a plurality of images from a plurality of diverse people, providing a first graphical user interface requiring a user to provide subject data, instrument data and environment data as metadata for each of the plurality of images, providing a second graphical user interface requiring a user to form a bounding box about a face of a subject in each of the plurality of images, providing a third graphical user interface requiring annotators to provide annotations for each of the plurality of images, and storing the plurality of images as the dataset; and training or evaluating the machine learning or artificial intelligence system by using the diverse dataset in the machine learning or artificial intelligence system.

Embodiments of the present invention provide a computer-implemented method for constructing a dataset of human images comprising collecting a plurality of images from a plurality of diverse people; providing a first graphical user interface requiring a user to provide subject data, instrument data and environment data as metadata for each of the plurality of images; providing a second graphical user interface requiring a user to form a bounding box about a face of a subject in each of the plurality of images; providing a third graphical user interface requiring annotators to provide annotations for each of the plurality of images; and storing the plurality of images as the dataset, wherein the subject data includes demographic information, physical characteristics, actions and head pose.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
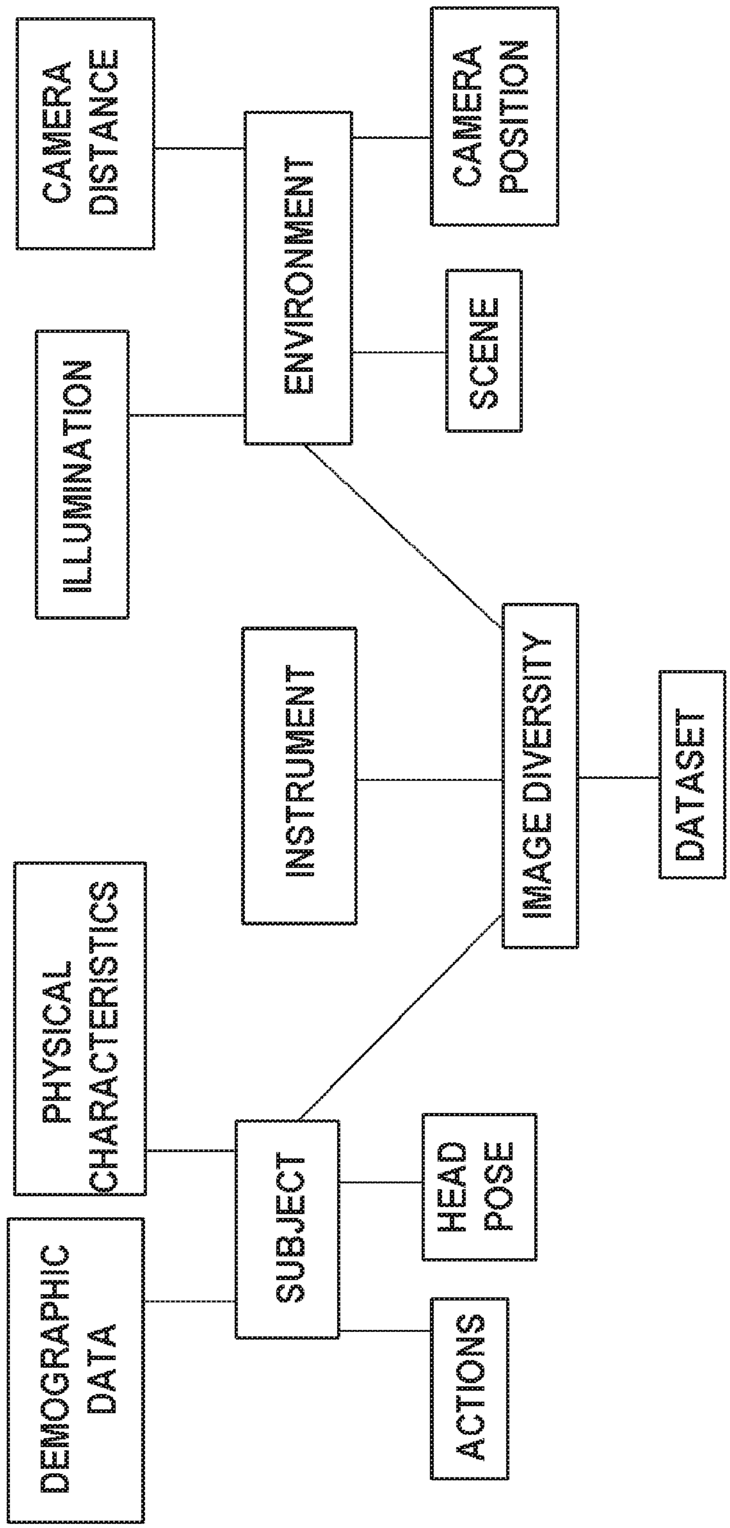
FIG. 1 illustrates a pictorial representation of diversity provided in an image dataset by the systems and methods according to an exemplary embodiment of the present invention.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G, and the like.

Embodiments of the present invention may include apparatuses for performing the operations disclosed herein. An apparatus may be specially constructed for the desired purposes, or it may comprise a device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

As is well known to those skilled in the art, many careful considerations and compromises typically must be made when designing for the optimal configuration of a commercial implementation of any method or system, and in particular, the embodiments of the present invention. A commercial implementation in accordance with the spirit and teachings of the present invention may be configured according to the needs of the particular application, whereby any aspect(s), feature(s), function(s), result(s), component (s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a diverse dataset of human images that can be created by collecting a plurality of images from a plurality of diverse people. A first graphical user interface requires a user to provide subject data, instrument data and environment data as metadata for each of the plurality of images. A second graphical user interface requires a user to form a bounding box about a face of a subject in each of the plurality of images. A third graphical user interface requires annotators to provide annotations for each of the plurality of images. The dataset may be used for training or evaluating machine learning or artificial intelligence systems, such as systems for body and face detection, body and face landmark detection, body and face parsing, face alignment, face recognition, face verification, image editing and image synthesis.

FIG. 1 illustrates how image diversity can be obtained through subject data, instrument data and environment data. The subject data can include demographic data, physical characteristics, actions and head pose. The environment data can include illumination, camera distance, scene and camera position. Details of these image diversity factors are provided below.

In one implementation, a computer system collects, stores and manages an image dataset including data representing multiple images. In one implementation, the images are images of people. The dataset includes or indicates various metadata and associated data with the image data. The computer system receives or assigns metadata values to the image data as the data is collected and as the data is accessed. In some cases, the data is collected or derived by the system, or a part thereof, or a related system, directly from users and from subjects in images. In other cases, some or all of the data is collected by other systems and parties (e.g., vendors) and provided to the system. Some implementations are provided as a computer system including components for data processing, storage, access, exchange, input and output and subsystems to provide the operations and functionality described here, while other implementations can include a combination of local and distributed systems, components, hardware, and software. Various implementations and examples are described here that illustrate aspects of these image dataset collections, and collection and management systems. Not necessarily every implementation includes every specification, characteristic, operation, or parts thereof as described here.

In one implementation, an image dataset provides a general purpose consensual human-centric image dataset of human bodies. In one such implementation, the images must include the head. The obtained dataset can be used to perform a variety of humancentric tasks, e.g., for training and evaluating commercial machine learning and artificial intelligence systems, in unconstrained settings.

In unconstrained settings, factors related to the subject (e.g., demographic information), instrument (e.g., camera hardware and software), and environment (e.g., illumination, camera distance) cannot be controlled. Therefore, one aim is to collect a dataset of human-centric images that is very diverse in terms of these three factors, where all annotated persons have given their written informed consent. This consent can be managed as data associated with the dataset or the images.

Consent

In one implementation, consent data is collected and stored for each person depicted in or otherwise identifiable by the dataset ("subject"). The consent data can represent the explicit informed consent of that person. In one example, each subject has consented for their biometric information to be used in the research and development of commercial ML/AI systems. In another example, electronic signatures may be used to document informed consent. One method of allowable electronic signatures in some jurisdictions is the use of a secure system for electronic or digital signature that provides an encrypted identifiable "signature." When properly obtained, an electronic signature can be considered an "original" for the purposes of recordkeeping. An electronic signature can include a "digital" signature on the consent document such as using commercial tools such as "DocuSign" or "Adobe Sign," or using a "I consent to the processing of my data" button or checkbox in an online form. In one implementation, the consent is separated out from any general terms and conditions of additional user information or agreement. All subjects are provided with a version of the consent form that they can retain for their records, whether it is a hardcopy or an electronic version.

In one implementation, subject characteristics such as age are factors used in collecting and managing data. In some implementations, additional consent is used when collecting images of any subject under the age of 18 years ("child"). In other implementations, data is not collected from any subject under the age of majority in their country of residence. In another example, additional consent is used for any subject aged 18 or over whose ability to protect themself from neglect, abuse, or violence is significantly impaired on account of disability, illness or otherwise ("vulnerable adult"). The additional consent requirement refers to the need for a parent or guardian to provide written informed consent for a child or vulnerable adult in their legal charge to appear in the dataset, and for the child or vulnerable adult's biometric information to be used in the research and development of commercial ML/AI systems. These consent conditions and consent details are used in the collection of images and associated data.

In some implementations, in addition to any measures normally taken by the data vendor to validate the English-language ability of data subjects, the data vendor may randomly select three multiple choice questions to present to each data subject before they begin working on the project. To reduce the chances of correct answers being shared among data subjects, the vendor should randomly select three questions to ask each data subject from a question bank. In some implementations, in order for a data subject to qualify to participate in the project, a data subject must answer at least two out of three questions correctly.

In some implementations, data vendors must validate the English-language ability of all data subjects, including, but not limited to, image subjects and data annotators.

Example Use Cases

Implementations can provide various functionalities using image datasets, including one or more of, but not limited to, the following use cases or applications: (1) body and face detection, which includes the task of localizing the human body and/or the face within a bounding box in an image; (2) body and face landmark detection, which includes the identification of the geometric structure of human bodies and faces, i.e., the localization of several key points (e.g., right eye inner, nose, right hip, left foot index); (3) body and face parsing, which includes the process of partitioning the human body and face into multiple segments (sets of pixels known as image objects), i.e., the assignment of a label to every pixel in an image such that pixels with the same label share certain characteristics (e.g., left eye, left arm, right hip); (4) face alignment, which includes the task of obtaining normalized translation, scale and rotation representations of human faces having identified their geometric structure; (5) face recognition, which includes the one-to-many matching of a query image to the most similar images within a given repository; (6) face verification, which includes the one-to-one confirmation of a query image to a given image; (7) image editing, which includes the semantic editing of image attributes, e.g., manipulating viewpoint and lighting, as well as higher-level abstractions such as, but not limited to, manipulating the face of a depicted subject such that their identity, ancestry, and/or age is changed; and (8) image synthesis, which includes the synthesis of photorealistic human-centric imagery (e.g., generating novel face images of non-existent subjects).

Data Collection

Implementations can use various data collection specifications and guidelines to control how data is collected, stored and managed. In one example, the system adjusts data or adjusts collection to meet or approach selected specifications. An example of one implementation managing data collection and several variations follows.

In this example, a "primary subject" refers to the person who is the "focus" of an image. The primary subject may be designated as any person in an image who has provided their informed consent. All other "consensual" persons (i.e., any other person who has provided their informed consent) in an image are designated as "secondary subjects".

Vendors must not collect data from residents of specified locations, including, for example: United States (U.S.) state of California, U.S. state of Illinois, U.S. state of Washington, U.S. state of Texas and mainland China, in the case that a vendor's business operations/employees/subcontractors are located or established in mainland China and the data is collected, accessed or otherwise processed in servers located in mainland China. In some implementations, data submitted from mainland China and Russia are required to be tagged in the delivery file.

In terms of the total number of images to be delivered, no more than 20% of the images contain subject-subject interaction annotations, i.e., where the primary subject is annotated as interacting with a secondary subject. In particular, no more than 20% of the images should contain annotations that relate to more than a single subject, where the maximum number of subjects that may be annotated in an image is two. Therefore, for any one image, there will be informed consent from at most two subjects.

In one implementation, the dataset is a collection of 1,000,000 images of 100,000-250,000 unique primary subjects (exactly 4-10 images per primary subject) and all agreed upon annotations. In another example, the dataset is a collection of 10,000 images of 1,000-2,500 unique primary subjects (exactly 4-10 images per primary subject) as well as all agreed upon annotations.

In one implementation, the consent data reflects that each primary subject agrees, in writing, not to submit any image containing themself to multiple entities or systems. That is, they may only contribute to one data collection effort with a single vendor.

In one implementation, the collection of data for a dataset and the data reflects requirements and information for wages. In one example, collection vendors pay, at minimum, the legal minimum wage per hour of work to primary image subjects and annotators. Minimum wage should be based on the country the image subject/annotator resides in. In the case of countries with no legal minimum wage, vendors must propose a rate for approval in advance.

The data for the dataset reflects compliance with the requirements, such as required wage and wage paid. In some implementations, vendors must submit a methodology report as part of the deliverables, documenting recruitment, compensation and task details. Recruitment details include, for example, how image subjects/annotators were recruited (e.g., social media advertisements, in-person recruitment). For social media/online/print-media recruitment advertisements, the text and images that will be used in the advertisements are required to be provided, along with names of platforms/publications they will be published on/in. Compensation details include, for example, how much image subjects/annotators located in each country were paid per hour, how many hours of work they were paid for, and how these figures were calculated, when and how image subjects/annotators were informed of the rate per hour or total compensation, the method by which they were paid (e.g., bank transfer, electronic payment) and any fees the vendor burdened the image subject/annotator with as part of the payment process (e.g., currency conversion fees, bank transfer fees). Task details include, for example, how is quality assurance (QA) is conducted, e.g., for collection, X images were reviewed per person; for annotation, the first Y images annotated by a unique individual were reviewed, followed by Z % of all future images assuming the Y images reached a given quality threshold.

Additional specifications and targets are discussed for various categories are discussed below.

Imaging

Factors related to the subject, instrument, and environment are not controlled in unconstrained settings. Therefore, when collecting data, it is valuable that diversity is maximized, along these dimensions, to obtain a dataset that is representative of the variability that exists in real-world contexts. Various conditions and combinations of conditions can be used to control the dataset. In one example, the images taken of a primary subject are collected over a wide span of time, or as wide a span of time as possible for a configuration. In one example, at least 50% of the images (per primary subject) should have been captured at least seven days apart. In another example, each image (per primary subject) must have been captured at least one day apart. In one example, when there are less than seven days between images, the primary subject must be wearing different clothing in each image, and each image must be taken in a different location and at a different time of day. To help facilitate the collection process, in one example, the submission of previously captured images are also used, i.e., images captured prior to the start of the data collection process initiated by the vendor. In one example, images will only be used in the collection if they meet all the requirements outlined for the system and collection. For example, although not limited to, satisfying a requirement that the capture device used was digital and released in the year 2011 or later.

In addition, the 4-10 images per primary subject must be as diverse as possible in terms of head and body pose, subject-object interactions, subject-subject interactions, time of capture, geographic location, scene, lighting and weather conditions, camera position, distance from the camera and landmark occlusions.

In one example, images of primary subjects must be the primary subject in actuality. For example, although not limited to, images of drawings, paintings, and/or reflections of a primary subject will be rejected. In addition, although, for example, glass constitutes an occlusion, imaging a subject through glass (e.g., a window) is permitted if other requirements are fulfilled, for example, but not limited to, those related to landmark annotatability. It should be noted that these requirements also extend to images that necessitate at least two subjects (primary and secondary).

In another example, images should not contain objectionable content whatsoever, for example, but not limited to, graphic violence, nudity, explicit sexual activity and/or themes, cruelty and/or obscene gestures.

As much as possible, the images should avoid containing trademarks and/or landmarks (e.g., images of subjects wearing logos). It is particularly important to try to avoid collecting images where any trademark and/or landmark appears very prominently.

Human Annotators and Annotations

In one implementation, human annotators are employed to estimate the characteristics of subjects and/or images. In one implementation, the annotators are required to be demographically diverse. In addition, each annotator must be associated with a unique identification number ("annotator identifier") so that the system can match their completed tasks with their demographic information. The identifier should be distinct from the identifier internally used by the vendor.

Human Annotator Pre-Screening Survey and Consent

In one implementation, the system uses characteristics and information about human annotators to manage the data and collection. Various combinations of information can be used to control the selection and participation of annotators, and the review of annotator data. Several examples follow.

In some implementations, all human annotators complete a pre-screening survey to ascertain their demographics (i.e., age, pronouns, nationality and ancestry). Moreover, as part of the pre-screening survey, each annotator will be required to provide explicit written informed consent to process their personal information (i.e., age, pronouns, nationality and ancestry). All demographic questions are mandatory and must be self-reported by each annotator.

In some implementations, each annotator's exact age in years is required and must be self-reported. An annotator's self-reported age must correspond to their age at the time of providing explicit informed consent.

In some implementations, each annotator's pronouns are required and must be self-reported. An annotator's self-reported pronouns must correspond to their pronouns at the time of providing explicit informed consent. If an annotator selects either "None of the above" or "Prefer not to say", then they are not permitted to select another option.

In some implementations, each annotator's nationality is required and must be self-reported. An annotator's self-reported nationality must correspond to their nationality at the time of providing explicit informed consent. Multiple nationality selections are permitted.

In some implementations, each annotator's country of residence is required and must be self-reported. An annotator's self-reported country of residence must correspond to their country of residence at the time of providing explicit informed consent. Multiple country of residence selections are permitted.

In some implementations, each annotator's ancestry is required and must be self-reported. An annotator's self-reported ancestry must correspond to their ancestry at the time of providing explicit informed consent. To obtain this information, for example, the system asks the annotator the following question: "Where do your ancestors (e.g., great grandparents) come from?". In addition, the system can provide annotators with an example to highlight the potential difference between their nationality and ancestry, for example: "For example, your nationality might be 'American', but your ancestors (e.g., great grandparents) might come from 'Europe' ('Southern Europe') and 'Africa' ('Western Africa' and 'Middle Africa')". That is, the system makes sure that the annotator understands that ancestry does not necessarily correspond to the region and subregion of their nationality. It should be noted that multiple region and subregion selections are permitted. Annotators must first select the region(s) and subregion(s) that best describe their ancestry. For example, "Africa ("Northern Africa") and "Oceania" ("Polynesia" and "Melanesia"). Moreover, it should be noted that only region-level ancestry is required, whereas subregion-level ancestry is optional. This is to allow for annotators who do not know their subregion-level ancestry for whatever reason. Nonetheless, annotators should be encouraged to provide this information if they are able to. If an annotator selects a region but does not select any subregions within the region, then the annotator will contribute to the counts of each subregion within the region. For example, consider an annotator who selects the regions "Americas" and "Asia", as well as subregions "Central Asia" and "Eastern Asia". In this scenario, the annotator contributes to the four subregions in the "Americas" and the two selected subregions in "Asia". Therefore, add ⅙ to each of the subregions counts of "Caribbean", "Central America", "South America", "Northern America", "Central Asia", and "Eastern Asia".

Human Annotator Diversity

In one implementation, the system uses criteria for the annotator demographics. Various combinations of information can be used to control the selection and participation of annotators, and the review of annotator data. Several examples follow.

A vendor uses a demographically diverse set of annotators. Demographically diverse pertains only to the age, pronouns, and ancestry categories defined as follows: (1) age groups: 18-30, 31-45, 46+; (2) pronouns: she/her/hers, he/him/his; and (3) ancestry: Africa, Americas, Asia, Europe, Oceania.

In total, there are 30 demographic groups based on the age, pronouns and ancestry categories defined above. For any particular annotation (e.g., bounding box annotations), each of the 30 demographic groups must, as a minimum, have performed at least 0.5% of the total number of annotations.

In cases where a vendor has multiple annotation stages, including, but not limited to, multiple stages of quality assurance, the annotators at each stage are required to be demographically diverse, where diverse pertains to the definition given above.

"Raw" Annotations

In one implementation, for any annotation task which requires more than one annotator, the system uses the "raw" annotations (i.e., each annotator's individual annotations) as opposed to aggregate annotations to model uncertainty. In one example, all annotations are stored as JSON files alongside the images to which they pertain.

It should be noted that the "raw" annotations include annotations performed prior to quality assurance as well as those arising from each stage of quality assurance.

Percent Distribution Ranges

In one implementation, percent distribution ranges, such as those used throughout this document, unless otherwise stated, pertain to the image's primary subjects. In addition, all self-reported annotations from consensual subjects (per image) are obtained directly from the subject themselves. The system avoids or limits annotating any person in an image who has not provided explicit written informed consent, such as based on consent data for the image. In one example, any image that is found to have any annotation related to a person who has not provided explicit written informed consent will be rejected by the system.

Submission Dates

In some implementations, when an image subject submits data to the data vendor, the data vendor must record the date and time that the data was submitted by the image subject. In this case, the delivered submission date and time must be associated with the data submitted by the image subject.

When an image subject provides their consent to the data vendor, the data vendor must record the date and time that consent was provided by the image subject. In this case, the delivered consent submission date and time must be associated with each data point submitted by the image subject.

When an annotator provides their consent to the data vendor, the data vendor must record the date and time that consent was provided by the image subject. In this case, the delivered consent submission date and time must be associated with each annotation performed by the annotator.

Subject

Various implementations use various operations and data to collect, store, and manage images, image data and data corresponding to the images. For example, in one implementation, each consensual subject is associated with a unique identification number, or subject identifier. Various additional implementations and examples about subject data follow.

Nonconsensual Persons Annotations

In one implementation, if there is at least one nonconsensual person visible in an image's scene, regardless of their spatial size, the system annotates the image as containing a nonconsensual person. This annotation may be initially performed by the primary subject or image creator, however it must be validated as being correct by the vendor. The system avoids annotating any nonconsensual persons unless explicitly requested and authorized, such as by an approval code associated with the image.

In some implementations, for an image containing nonconsensual subjects to be accepted, there are three requirements the image must fulfill: (1) nonconsensual subjects must not be in front of (or occlude) primary and/or secondary subjects; (2) nonconsensual subjects should not cover more than a total of 20% of the image; and (3) Total overlap of nonconsensual subjects with a primary/secondary subject should not be greater than 15% of the primary/secondary subject outline, per primary/secondary subject. It should be noted that, in some implementations, all three requirements must be satisfied simultaneously.

Facial Bounding Box Annotations

In one implementation, the system uses bounding boxes in images. In one example, all consensual subjects (per image) must have a bounding box (provided as a set of coordinates defining a rectangle) placed around their face, where the bounding box is required to tightly contain the forehead, chin, and cheek. Each bounding box must be annotated (drawn) by human annotators and associated with each subject's unique identifier. In one example, using automated tools as part of this procedure is documented by data and may require additional authorization data to use or include. The system can provide the annotators a graphical user interface to provide the bounding boxes to the faces of the consensual subjects in the images.

Segmentation Mask Annotations

In one implementation, the system uses segmentation to manage or label images, such as to identify body parts. In one example, each consensual subject's whole body (per image) must be segmented based on the following 28 segmentation categories: face skin (including ears), upper body (from the upper neck to the hip line), left arm skin (skin including left hand), right arm skin (skin including right hand), left leg skin (including left foot), right leg skin (including right foot), head hair, left eyebrow, right eyebrow, left eye, right eye, nose, upper lip, lower lip, inner mouth, left shoe, right shoe, headwear (e.g., headphones, hat, cap, helmet, bandana, head scarf, hairnet, sports/head band, turban, hijab, hood, veil, wig, crown, kippah, snood, earmuffs), mask (e.g., medical mask, face shield, military mask, respirator, costume/theatre mask, sports mask, ritual mask, balaclava), eyewear (e.g., sunglasses, eyeglasses, goggles, VR headset), upper body clothes (e.g., top, t-shirt, sweatshirt, shirt, blouse, sweater, cardigan, vest, cape, jacket, coat), lower body clothes (e.g., pants/trousers, shorts, skirt, tights, stockings), full body clothes (e.g., dress, jumpsuit), sock or legwarmer, neckwear (e.g., scarf, tie), bag, glove, and jewelry or timepiece (e.g., watch, earring, nose ring, eyebrow ring, lip, ring, bracelet, ring (finger), necklace, watch).

In one example, the annotations must be estimated (drawn) by human annotators and each subject's related segmentations (per image) must be associated with their unique identifier. In some implementations, a graphical user interface is provided to the annotator to add the appropriate annotations on the subjects, including the associated unique identifier. In one example, using automated tools as part of this procedure is documented by data and may require additional authorization data to use or include. Each segmentation category must be provided as a set of coordinates defining a polygon. If a subject is occluded by a movable non-environmental object (e.g., cup, newspaper, food, hockey stick, ball) or immovable environmental object/structure (e.g., door, tree, fence, car, water) then the segmentation masks should be drawn around such objects, possibly resulting in disconnected segmentation mask regions and polygons.

Pose Landmark Annotations

In one implementation, the system uses landmarks to manage images. In one example, each consensual subject's face and body landmarks (per image) must be annotated based on the following landmarks: nose, right eye inner, right eye, right eye outer, left eye inner, left eye, left eye outer, right ear, left ear, mouth right, mouth left, right shoulder, left shoulder, right elbow, left elbow, right wrist, left wrist, right pinky knuckle, left pinky knuckle, right index knuckle, left index knuckle, right thumb knuckle, left thumb knuckle, right hip, left hip, right knee, left knee, right ankle, left ankle, right heel, left heel, right foot index, and left foot index. The annotations must be estimated by human annotators and each subject's landmarks (per image) must be associated with their unique identifier. It should be noted that each type of landmark must be annotatable in at least 10% of the delivered images.

In some implementations, if a landmark is occluded by an extraneous accessory, structure, object, or other person then it should not be annotated. Extraneous relates to accessories, structures, objects, and persons that are not a part of, or worn by, the subject being annotated. If, however, a landmark is occluded by a subject's own body clothing or accessories (e.g., dress, t-shirt, trousers) then it may be annotated as long as the location of the landmark is not ambiguous.

In cases where the thumb, pinky, and index of the left and right hand are not visible, e.g., due to a subject wearing gloves, then the annotator can assume and annotate the location of these landmarks. In cases where the index and heel of the left and right foot are not visible, e.g., due to a subject wearing shoes, then the annotator can assume and annotate the location of these landmarks.

Subject—Demographic Information

In various implementations, the system uses demographic information for subjects. In one example, the system collects data from a variety of consensual subjects, specifically by focusing on their demographics (sensitive attributes). Subjects invariably share one or more characteristics (e.g., age, pronouns, ancestry, nationality), thus forming demographic groups. For example, using a combination of factors for age, pronouns, and ancestry categories, a large number of demographic groups can be formed.

In some implementations, in total, there are 264 intersectional demographic subgroups based on the age, pronouns, and ancestry categories defined as follows: Age groups: 18-29, 30-39, 40-49, 50-59, 60-69, 70+; Pronouns: She/her/hers, He/him/his; and Ancestry: Northern Africa, Eastern Africa, Middle Africa, Southern Africa, Western Africa, Caribbean, Central America, South America, Northern America, Central Asia, Eastern Asia, South-eastern Asia, Southern Asia, Western Asia, Eastern Europe (including Northern Asia), Northern Europe (including Channel Islands), Southern Europe, Western Europe, Australia and New Zealand, Melanesia, Micronesia, Polynesia.

In terms of the total number of images to be delivered, the primary subjects in each demographic group are represented in at least 0.1% of the images. While this represents the minimum representation, for example, a vendor should aim to collect images from subjects such that each group is approximately equally represented in the final dataset.

Furthermore, to avoid spurious correlations, the system avoids collecting images of any one group under the same conditions. For instance, but not limited to, refraining from collecting images of one demographic group exclusively indoors.

Subject—Demographic Information—Age

In one implementation, the system uses age as demographic information. In one example, the system collects data from consensual subjects who vary in terms of age. The system can use the following coarse age group (in years) categories alongside the required percent distribution range (in square brackets, e.g. [min-max %]): 18-29 [2%-], 30-39 [2%-], 40-49 [2%-], 50-59 [2%-], 60-69 [2%-] and 70-[2%-]

In one example, each imaged subject's exact age, in years (per image), is required and must be self-reported. A subject's self-reported age must correspond to their age at the time of image capture. In addition, each subject's facial bounding box (per image) must be associated with their age at the time of image capture.

Subject—Demographic Information—Pronouns

In some implementations, data can be collected from consensual subjects who vary in terms of their self-identified pronouns. The system defines the following pronoun categories alongside the required percent distribution range (in square brackets, e.g. [min-max %]): She/her/hers [45%-], He/him/his [45%-], They/them/their [0%-], Ze/zir/zirs [0%-], None of the above [0%-] and Prefer not to say [0%-].

In some implementations, each image subject's pronouns are required and must be self-reported. A subject's self-reported pronouns must correspond to their pronouns at the time of image capture (per image). In addition, each subject's facial bounding box (per image) must be associated with their pronouns. Selection of multiple pronouns per image is permitted, except when a subject selects "None of the above" or "Prefer not to say". If a subject selects either "None of the above" or "Prefer not to say", then they are not permitted to select another option.

Subject—Demographic Information—Nationality

In one implementation, the system uses nationality as demographic information. In one example, the system collects data from consensual subjects who vary in terms of nationality.

In one example, each subject's nationality is required and must be self-reported. A subject's self-reported nationality must correspond to their nationality at the time of image capture (per image). Multiple nationality selections are permitted. In addition, each subject's facial bounding box (per image) must be associated with their nationality.

In some implementations, vendors can provide subjects with a list of nationalities to choose from. In some implementations, a list of nationalities can be chosen from a governmental list, such as that provided by the UK government. A "Not listed" option should also be listed, which allows for optional free-text input of nationality.

Subject—Demographic Information—Country of Residence

In one implementation, the system uses country of residence as demographic information. In one example, the system collects data from consensual subjects who vary in terms of country of residence.

In one example, each subject's country of residence is required and must be self-reported. A subject's self-reported country of residence must correspond to their country of residence at the time of image capture (per image). Multiple country of residence selections are permitted. In some implementations, the country of residence does not need to be collected per image.

In some implementations, vendors can provide subjects with a list of countries to choose from. In some implementations, a list of countries can be chosen from a governmental list, such as that provided by the UK government. A "Not listed" option should also be listed, which allows for optional free-text input of country.

Subject—Demographic Information—Ancestry

In one implementation, the system uses ancestry as demographic information. In one example, the system collects data from consensual subjects who vary in terms of their ancestry.

In some implementations, ancestry can be based on the United Nations geoscheme system. The geoscheme was devised by the United Nations Statistics Division based on the M49 coding classification. It should be noted that *Antarctica* is excluded, since it does not have any subregions or country-level areas.

In some implementations, the system defines the following geoscheme-based ancestry categories and subcategories alongside the required percent distribution range (in square brackets, e.g. [min-max %]): Africa, with subcategories of Northern Africa [1%-], Eastern Africa [1%-], Middle Africa [1%-], Southern Africa [1%-] and Western Africa [1%-]; Americas, with subcategories of Caribbean [1%-], Central America [1%-], South America [1%-] and Northern America [1%-]; Asia, with subcategories of Central Asia [1%-], Eastern Asia [1%-], South-eastern Asia [1%-], Southern Asia [1%-] and Western Asia [1%-]; Europe, with subcategories of Eastern Europe (including Northern Asia) [1%-], Northern Europe (including Channel Islands) [1%-], Southern Europe [1%-] and Western Europe [1%-]; and Oceania, including subcategories of Australia and New Zealand [1%-], Melanesia [1%-], Micronesia [1%-] and Polynesia [1%-].

In one example, each subject's ancestry is required and must be self-reported. For example, the system asks the subject the following question: "Where do your ancestors (e.g., great grandparents) come from?". In addition, the system provides subjects with an example to highlight the potential difference between their nationality and ancestry, for example: "For example, your nationality might be 'American', but your ancestors (e.g., great-grandparents) might come from 'Europe' ('Southern Europe') and 'Africa' ('Western Africa' and 'Middle Africa')". That is, the system makes sure that the subject understands that ancestry does not necessarily correspond to the region and subregion of their nationality. In addition, each subject's facial bounding box (per image) must be associated with their ancestry. It should be noted that multiple region and subregion selections are permitted. Subjects must first select the region(s) and subregion(s) that best describe their ancestry, for example, "Africa ("Northern Africa") and "Oceania" ("Polynesia" and "Melanesia"). Moreover, it should be noted that only region level ancestry is required, whereas subregion-level ancestry is optional. This is to allow for subjects who do not know their subregion-level ancestry for whatever reason. Nonetheless, subjects should be encouraged to provide this information if they are able to. If an annotator selects a region but does not select any subregions within the region, then the annotator will contribute to the counts of each subregion within the region. For example, consider an annotator who selects the regions "Americas" and "Asia", as well as subregions "Central Asia" and "Eastern Asia". In this scenario, the annotator contributes to the four subregions in the "Americas" and the two selected subregions in "Asia". Therefore, add 1/6 to each of the subregions counts of "Caribbean", "Central America", "South America", "Northern America", "Central Asia", and "Eastern Asia".

Subject—Demographic Information—Disability

In one implementation, the system uses disability information as demographic information. In one example, the system collects data from consensual subjects who vary in terms of types of difficulties they face. This is to ensure that subjects with disabilities are included. Based on the American Community Survey, the system defines below disability categories and subcategories: hearing difficulty-deaf or serious difficulty hearing; vision difficulty-blind or serious difficulty seeing, even when wearing glasses; cognitive difficulty-difficulty remembering, concentrating, or making decisions because of a physical, mental, or emotional problem; ambulatory difficulty-serious difficulty walking or climbing stairs; self-care difficulty-having difficulty bathing or dressing; independent living difficulty-difficulty doing errands alone such as visiting a doctor's office or shopping because of a physical, mental, or emotional problem; or prefer not to say.

In one example, each subject's disability category must be self-reported; however, this is optional, i.e., a subject may choose whether to disclose this information. Multiple "Disability" category selections are permitted. A subject's self-reported disability must correspond to their disability or disabilities at the time of image capture (per image). In addition, each subject's facial bounding box (per image) must be associated with their disability categories.

In some implementations, to obtain responses from participants, the system can ask them: "Do you have any disabilities/difficulties?". It should be noted that if a subject selects either "None of the above" or "Prefer not to say", then they are not permitted to select another option.

Subject—Physical Characteristics

In various implementations, the system uses physical characteristic information for subjects. In one example, the system collects data from consensual subjects with a variety of physical characteristics. Demographic diversity results in a variety of subjects with different physical characteristics.

Subject—Physical Characteristics—Skin Tone

In one implementation, the system uses skin tone as physical characteristic information. In one example, the system collects data from consensual subjects with a variety of skin tones. In some implementations, the system defines the following six skin tone categories based on six red-green-blue [R, G, B] colors, such as [102, 78, 65], [136, 105, 81], [164, 131, 103], [175, 148, 120], [189, 163, 137] and [198, 180, 157].

The system can obtain from each subject (once) their self-reported "natural" skin tone and associate this information with their unique subject identifier. The subject must select one of the six categories that best matches their natural skin tone. In addition, if the system detects that a subject's skin tone when an image was captured differs from their natural skin tone, then the subject can self-report their apparent skin tone (per image) and associate this with their facial bounding box.

Of course, while six exemplary skin tones are described herein, additional skin tone colors may be provided to provide additional selections for the subject's self-reported skin tone.

Subject—Physical Characteristics—Eye Color

In one implementation, the system uses eye color as physical characteristic information. In one example, the system collects data from consensual subjects with a variety of eye colors. The system defines the following eye color categories: none (absence of an eye), blue, gray, green, hazel, brown, red and violet and not listed (any head hair color that does not fall into one of the above categories).

In one example, the system obtains from each subject (once) their self-reported "natural" left and right eye color and associate this information with their unique subject identifier. For clarity, the subject must report their left and right eye color separately. Multiple left eye and right eye color selections are permitted (e.g., "Blue" and "Gray" for the left eye). If a subject selects "Not listed", then the system provides the subject with the opportunity to report their left eye color as free-form text. The free-form text box must be marked as optional.

In addition, if a subject's eye colors when an image was captured differ from their natural eye color due to, for instance, contact lenses, then the system has the subject self-report their "non-natural" left eye and right eye color (per image) and associate this with their facial bounding box. Note, however, that if an eye is closed (or not visible, e.g., due to sunglasses) in an image its color should be categorized as "None." Again, the subject must report their left and right eye color separately. For clarity, a subject's self-reported eye colors must correspond to their eye colors at the time of image capture (per image). Multiple left eye and right eye color selections are permitted (e.g., "Blue" and "Gray" for the left eye). If a subject selects "Not listed", then the system provides the subject with the opportunity to report their left eye color as free-form text. The free-form text box must be marked as optional.

Subject—Physical Characteristics—Head Hair Type

In one implementation, the system uses head hair type as physical characteristic information. In one example, the system collects data from consensual subjects with a variety of head hair types. The system defines the following head hair type categories: none (absence of head hair), straight (fine, medium, or coarse), wavy (loose, defined, or wide waves), curly (loose curls, tight curls, or corkscrews), kinky-coily (defined coil, z-angled coil, or tight coil) or not listed (any head hair type that does not fall into one of the above categories).

In one example, the system obtains from each subject (once) their self-reported "natural" head hair type and associates this information with their unique subject identifier. "Natural" refers to the head hair type of a subject if they allowed their hair to grow naturally without applying any procedures to it.

The system can provide visual aids to assist subjects in deciding which category their head hair type falls under.

In addition, if a subject's head hair type when an image was captured differs from their natural head hair type, then the system has the subject self-report their "non-natural" head hair type (per image) and associate this with their facial bounding box.

It should be noted that if a subject's head hair is not visible at all in an image, then the head hair type should be categorized as "None". If a subject selects "Not listed", then the system provides the subject with the opportunity to report their head hair type as free-form text. The free-form text box must be marked as optional.

Subject—Physical Characteristics—Head Hairstyle

In one implementation, the system uses head hairstyle as physical characteristic information. In one example, the system collects data from consensual subjects with a variety of head hairstyles. The system defines the following list of head hairstyle categories: none (absence of head hair); buzz cut; short, including subcategories of up, half-up, down and not listed (any head hairstyle that does not fall into one of the above subcategories); medium, including subcategories of up, half-up, down and not listed (any head hairstyle that does not fall into one of the above subcategories); long, including subcategories of up, half-up, down and not listed (any head hairstyle that does not fall into one of the above subcategories); and not listed (any head hairstyle that does not fall into one of the above categories).

In one example, each subject's head hairstyle (per image) must be self-reported and associated with their facial bounding box. A subject's self-reported hairstyle must correspond to their head hairstyle at the time of image capture (per image). If a subject selects "Not listed", then the system provides the subject with the opportunity to report their head hairstyle as free-form text. The free-form text box must be marked as optional. It should be noted that if a subject selects "Short", "Medium", or "Long" they need not select a subcategory (i.e., subcategory selection is optional).

It should also be noted that if a subject's head hair is not visible at all in an image, then the head hairstyle should be categorized as "None".

Subject—Physical Characteristics—Head Hair Color

In one implementation, the system uses head hair color as physical characteristic information. In one example, the system collects data from consensual subjects with a variety of head hair colors. The system defines the following list of head hair color categories: none (absence of head hair), very light blond, light blond, blond, dark blond, light brown to medium brown ("chatain"), dark brown/black ("brunet"), red, red blond, gray, white and not listed (any head hair color that does not fall into one of the above categories).

In one example, the system obtains from each subject (once) their self-reported "natural" head hair color and associate this information with their facial bounding box. "Natural" refers to the head hair color of a subject if they allowed their head hair to grow naturally without applying any procedures to it or exposing it to the sun. Therefore, to give an example, those who have "gone or turned" gray should report their natural head hair color as gray, since the color is due to naturally occurring processes (e.g., the loss of melanocytes which produce color).

Multiple head hair color selections are permitted. If a subject selects "Not listed", then the system provides the subject with the opportunity to report their head hair color as free-form text. The free-form text box must be marked as optional.

In addition, if a subject's head hair color when an image was captured differs from their natural head hair color due to, for instance, but not limited to, hair dyes, then the system has the subject self-report their "non-natural" head hair color (per image) and associates this with their facial bounding box. For clarity, a subject's self-reported head hair color must correspond to their head hair color at the time of image capture. Multiple head hair color selections are permitted (e.g., "White" and "Gray"). If a subject selects "Not listed", then the system provides the subject with the opportunity to report their head hair color as free-form text. The free-form text box must be marked as optional.

It should be noted that if a subject's head hair is not visible at all in an image, then the head hair color should be categorized as "None".

Subject—Physical Characteristics—Facial Hairstyle

In one implementation, the system uses facial hairstyle as physical characteristic information. In one example, the system collects data from consensual subjects with a variety of facial hairstyles. The system defines the following list of facial hairstyle categories and subcategories: none (including clean shaven), beard, mustache and goatee.

In one example, each subject's facial hairstyle (per image) must be self-reported and associated with their facial bounding box. Multiple facial style selections are permitted, except when a subject selects "None (including clean shaven)". It should be noted that if a subject's facial hair is not visible at all in an image, then the facial hairstyle should be categorized as "None."

Subject—Physical Characteristics—Facial Hair Color

In one implementation, the system uses facial hair color as physical characteristic information. In one example, the system collects data from consensual subjects with a variety of facial hair colors. The system defines the following list of facial hair color categories: none (absence of facial hair including, but not limited to, clean shaven), very light blond, light blond, blond, dark blond, light brown to medium brown ("chatain"), dark brown/black ("brunet"), red, red blond, gray, white and not listed (any facial hair color that does not fall into one of the above categories).

In one example, the system obtains from each subject (once) their self-reported "natural" facial hair color and associates this information with their facial bounding box. "Natural" refers to the facial hair color of a subject if they allowed their facial hair to grow naturally without applying any procedures to it or exposing it to the sun. Therefore, to give an example, those who have "gone or turned" gray should report their natural facial hair color as gray, since the color is due to naturally occurring processes (e.g., the loss of melanocytes which produce color). Multiple facial hair color selections are permitted. If a subject selects "Not listed", then the system provides the subject with the opportunity to report their facial hair color as free-form text. The free-form text box must be marked as optional.

In addition, if a subject's facial hair color when an image was captured differs from their natural facial hair color due to, for instance, but not limited to, hair dyes or sun exposure, then the system has the subject self-report their "non-natural" facial hair color (per image) and associates this with their facial bounding box. For clarity, a subject's self-reported facial hair color must correspond to their facial hair color at the time of image capture. Multiple facial hair color selections are permitted (e.g., "White" and "Gray"). If a subject selects "Not listed", then the system provides the subject with the opportunity to report their facial hair color as free-form text. The free-form text box must be marked as optional.

It should be noted that if a subject's facial hair is not visible at all in an image, then the facial hair color should be categorized as "None."

Subject—Physical Characteristics—Height

In one implementation, the system uses height as physical characteristic information. In one example, the system collects data from consensual subjects who vary in terms of height.

In one example, each subject's height (per image) must be self-reported and associated with their unique identifier. A subject's self-reported height must correspond to their height at the time of image capture (per image). The system permits each subject to self-report their height using their preferred system of measurement, e.g., feet (inches) or meters (centimeters), then converts all values to the International System of Units base unit of length, i.e., meters (centimeters).

Subject—Physical Characteristics—Weight

In one implementation, the system uses weight as physical characteristic information. In one example, the system collects data from consensual subjects who vary in terms of weight.

In one example, each subject's weight (per image) must be self-reported and associated with their unique identifier. A subject's self-reported weight must correspond to their weight at the time of image capture. The system permits each subject to self-report their weight using their preferred system of measurement, e.g., feet (pounds) or kilograms (grams), then converts all values to the International System of Units base unit of mass, i.e., kilograms (grams).

Subject—Physical Characteristics—Facial Marks

In one implementation, the system uses facial marks as physical characteristic information. In one example, the system collects data from subjects who vary in terms of facial marks. The system defines the following list of facial mark categories: none (no visible facial marks), tattoos, birthmarks, scars, burns, growths, make-up, face paint, acne or not listed (any facial mark that does not fall into one of the above categories).

In one example, each subject's visible facial marks (per image) must be self-reported and associated with their facial bounding box. Multiple facial mark category selections are permitted. If a subject selects "Not listed", then the system provides the subject with the opportunity to report their facial mark(s) as free-form text. The free-form text box must be marked as optional. It should be noted that the subject should be made aware that the facial mark must be visible in the image, if it is not visible in the image then it should not be annotated.

Subject—Physical Characteristics—Biologically Related Subjects

In one implementation, the system uses biological relation as physical characteristic information. In one example, the system defines the following list of relation categories: biologically related (e.g., brother, sister, mother, father, uncle, grandmother, cousin) and unrelated.

In one example, each consensual subject (per image) must be associated with the identifiers of other consensual subjects in the image who are biologically related. For clarity, a husband and a wife are typically not biologically related and therefore are "unrelated" in the above classification scheme.

Subject—Physical Characteristics—Pregnancy Status

In one implementation, the system uses pregnancy status as physical characteristic information. In one example, the system collects data from consensual subjects who vary in terms of pregnancy status. The system defines the following pregnancy status categories: not pregnant; pregnant, including the subcategories of visibly pregnant and not visibly pregnant; and prefer not to say.

In one example, each subject's pregnancy status category must be self-reported; however, this is optional, i.e., a subject may choose whether to disclose this information. Multiple category and subcategory selections are not permitted. It should be noted that if a subject selects "Pregnant" they need not select any subcategories (i.e., subcategory selection is optional). A subject's self-reported pregnancy status category must correspond to their pregnancy status at the time of image capture (per image). In addition, each subject's facial bounding box (per image) must be associated with their pregnancy status category. This question must be presented to all subjects regardless of their demographic attributes (e.g., pronouns).

Subject—Actions

In various implementations, the system uses action information for subjects. In one example, the system collects data from subjects performing a variety of actions, specifically by encouraging subjects to move freely and interact with their environment (objects and other subjects) as they normally would.

The system considers subject body pose, subject-object interaction, and subject-subject interaction as well as their combinations. Maximizing diversity with respect to subject body pose, subject-object interaction, and subject-subject interaction will invariably result in, for example, subject variability, arbitrary face scales, non-uniform illumination conditions, environmental occlusions, arbitrary camera positions and orientations, wide variability in head pose, and motion blur.

Subject—Actions—Body Pose

In one implementation, the system uses body pose as action information. In one example, the system collects data from consensual subjects in a variety of body poses. The system defines the following list of body pose categories alongside the required percent distribution range (in square brackets, e.g., [min-max %]): standing [5%-], sitting [5%-], walking [5%-], bending/bowing (at the waist) [5%-], lying down/sleeping [5%-], performing martial/fighting arts (including wrestling, boxing, etc.) [5%-], dancing [5%-], running/jogging [5%-], crouching/kneeling [5%-], getting up [5%-], jumping/leaping [5%-], falling down [0%-], crawling [5%-], swimming [5%-] and not listed (any action that does not fall into one of the above categories).

In one example, each subject's body pose (per image) must be self-reported and associated with their unique identifier. If a subject selects "Not listed", then the system provides the subject with the opportunity to report their body pose as free-form text. The free-form text box must be marked as optional.

Subject—Actions—Subject-Object Interaction

In one implementation, the system uses subject-object interaction as action information. In one example, the system collects data from consensual subjects interacting with a variety of objects. It should be noted that another person does not constitute an object. The system defines the following list of subject-object interaction categories alongside the required percent distribution range (in square brackets, e.g., [min-max %]): none (the subject is not interacting with any object) [0.1-50%], riding (object: e.g., bicycle, motorbike, skateboard, scooter, horse) [0.1%-], driving (object: e.g., car, truck) [0.1%-], watching (object: e.g., television, sports match, theater) or reading (object: e.g., book, magazine, newspaper, e-reader, leaflet) [0.1%-], smoking (object: e.g., hookah, cigarette, cigar) [0%-], eating (object: e.g., food) [0.1%-], drinking (object: e.g., liquid) [0.1%-], opening or closing (object: e.g., window, car door, refrigerator, box) [0.1%-], lifting/picking up or putting down (object: e.g., chair, mobile phone, bag, food) [0.1%-], writing/drawing or painting (object: e.g., letter, email) [0 0.1%-], catching or throwing (object: e.g., ball, keys) [0.1%-], pushing (object: e.g., shopping trolley, car), pulling (object: e.g., bag, box, toy, duvet) or extracting (i.e., removing/taking out an object from another object, especially by effort or force, such as a tooth, root vegetable, etc.) [0.1%-], putting on or taking off clothing (object: e.g., hat, trousers, socks, shirt, sweater) [0.1%-]. entering or exiting (object: e.g., door, elevator) [0.1%-], climbing (object: e.g., stairs, mountain, rock face, rope) [0.1%-], pointing at (object) [0.1%-], shooting at (object) [0%-], digging/shoveling using (object: e.g., shovel, spade, spading fork, trowel, pick) [0.1%-], playing with pets/animals [0.1%-], playing musical instrument (e.g., violin, piano, saxophone, clarinet, drums) [0.1%-], playing (object: e.g., tabletop game, boardgame, sports) [0.1%-], using an electronic device (object: e.g., mobile phone, camera, video recorder, computer, laptop, tablet computer, video game controller, headphones) [0.1%-], cutting or chopping (object) [0.1%-], cooking (excluding cutting or chopping) [0.1%-], fishing [0.1%-], rowing (object: e.g., boat) [0.1%-], sailing (object: e.g., boat) [0.1%-], brushing teeth [0.1%-], hitting (object: e.g., ball, wall) with another object or using their hands [0.1%-], kicking (object: e.g., ball) [0.1%-], turning (object: e.g., screwdriver, doorknob) [0.1%-] and not listed (any subject-object interaction that does not fall into one of the above defined categories).

In one example, each subject's interaction with an object or objects (per image) must be self-reported and associated with their unique identifier. Multiple subject-object interaction selections are permitted. For clarity, a subject's self-reported subject-object interactions must correspond to what is apparent in the image. For example, if a subject selects "Cutting or chopping" then the subject must be "Cutting or chopping" something in the image which should be apparent to a third-party when viewing the image for the first time. If a subject selects "Not listed", then the system provides the subject with the opportunity to report their interaction with an object or objects as free-form text. The free-form text box must be marked as optional.

In some implementations, if a subject selects N categories, then the system can add 1/N to each of the category counts.

Subject—Actions—Subject-Subject Interaction

In one implementation, the system uses subject-subject interaction as action information. In one example, the system collects data from consensual subjects interacting with other consensual subjects. In terms of the total number of images to be delivered, the system can use a limit on these images. In one example, the system requires that no more than 20% of the images contain subject-subject interaction annotations, i.e., where the primary subject is annotated as interacting with a secondary subject. In particular, no more than 20% of the images should contain annotations that relate to more than a single subject, where the maximum number of subjects that may be annotated in an image is two. For any one image, the system requires explicit informed consent from at most two subjects. The system defines below a list of subject-subject interaction categories alongside the required percent distribution range (in square brackets, e.g. [min-max %]). It should be noted that the distribution ranges are relative to the total number of images where the primary subject is interacting with at least one secondary subject.

Subject-subject interaction categories include the following: talking/listening/singing to (person or group) [1%-], watching/looking at (person) [1%-], grabbing (person) (e.g., martial arts, wrestling, contact sport, etc.) [1%-], hitting (person) (e.g., martial arts, wrestling, contact sport, etc.) [1%-], kicking (person) (e.g., martial arts, wrestling, contact sport, etc.) [1%-], pushing (person) (e.g., martial arts, wrestling, contact sport, etc.) [1%-], hugging/embracing (person) [1%-], giving/serving (object) to (person) or taking/receiving (object) from (person) [1%-], kissing (person) [1%-], lifting (person) [1%-], hand shaking [1%-], playing with (person or group) [1%-] andnot listed (any subject-subject interaction that does not fall into one of the above defined categories).

In one example, each subject's interaction with another subject or subjects (per image) must be self-reported and associated with their unique identifier. Multiple subject-subject interaction selections are permitted. For clarity, a subject's self-reported subject-subject interactions must correspond to what is apparent in the image. For example, if a subject selects "Hand shaking" then the subject must be shaking another subject's hand or hands, which should be apparent to a third party when viewing the image for the first time. If a subject selects "Not listed", then the system provides the subject with the opportunity to report their interaction with another subject or subjects as free-form text. The free-form text box must be marked as optional.

Subject—Head Pose

In one implementation, the system uses head pose information. In one example, the system collects data from consensual subjects with a variety of head poses, where pose refers to the yaw, pitch, and roll of the head.

The system defines the following list of coarse head pose categories: typical [10%-], where the absolute pitch is smaller than 300 and the absolute yaw is less than 30°; atypical [10%-], where the absolute pitch is larger than 300 and/or the absolute yaw is larger than 30°.

In one example, each subject's head pose (per image) must be annotated by human annotators and labeled as belonging to one of the above two categories. The system associates the labeled head pose with the subject's unique identifier.

Instrument

In one implementation, the system uses instrument information. The instrument refers to the camera device used to capture the data. In one example, the system collects data from consensual subjects using a variety of different digital camera makes and models. Varying the instrument will result in wide variability in terms of quality, resolution, and color.

In one implementation, any image captured using a device that does not meet the following requirements will be rejected by the system: (1) The device must be digital such as a smartphone, DSLR camera, or compact camera; (2) The device must be able to record Exif data when capturing images; (3) The device must capture images using at least an 8-megapixel camera; and (4) The device must have been released in the year 2011 or later.

In one implementation, any image that does not meet the following image capture requirements will be rejected by the system: (1) Each captured image must be stored as a JPEG or TIFF file, whichever is the device's default viewable output file format. It is acceptable to store an image using a different file format if and only if the device utilizes a different default viewable output file format/container (e.g., HEIC); (2) Each image must have its Exif data intact, except for the device serial number and GPS coordinate metatags which must be expunged prior to delivery to the system; (3) Images must not be post-processed including any additional compression; (4) Images must not be panoramas; (5) The aspect ratio of an image must be less than 2:1; (6) Images must not be captured using a fisheye lens or any other lens that results in spherical distortions; (7) Images should not be captured using digital zoom; however, optical zoom is permitted; (8) Images must not be captured while using filters; (9) Excessively blurry images caused by motion blur, or otherwise, will be rejected by the system. It should be noted that the system will accept images that have some degree of motion blur when it is unavoidable due to the action that a subject is performing (e.g., "Running/jogging"), as long as landmark annotatability requirements are fulfilled (if defined); and (10) Images must not be captured using the "Bokeh" (shallow depth-of-field) effect. That is, the majority of the image, in particular the background and primary subject (and if relevant also the secondary subject), must be in focus.

A non-exhaustive list of instrument-specific attributes and settings that should be varied where appropriate, and with the above requirements in mind, are as follows: lens, image sensor, image stabilization, high dynamic range mode, aperture, shutter speed, ISO and flash mode.

In one example, Exif metadata is required to record the diversity in camera makes and models used for capture, the date and time of capture (permitting the approximation of the weather at the time of capture), as well as the settings used during capture.

To account for erroneously calibrated device settings (i.e., date time original), it is required that the creator (or subject) reports, alongside the captured image, the date of capture (e.g., 4 Feb. 2021) as well as an approximate one-hour time window of capture (e.g., 00:00-00.59, 10:00-10:59, 14:00-14:59). The system does not edit the date time original Exif metadata tag and provides the reported date time as a separate annotation.

To account for erroneously calibrated device settings (i.e., GPS coordinates), it is required that the creator (or subject) reports, alongside the captured image, the city, state/province/county, and country of capture (e.g., New York City, New York, United States). Prior to expunging the Exif GPS metatag, the system (or another before delivery to the system) extracts and includes as part of the annotations the city, state/province/county, and country of capture according to the Exif GPS metatag. For clarity, a vendor must provide both the image creator reported city, state/province/county, and country of capture, as well as the city, state/province/county, and country of capture according to the Exif GPS metatag.

Environment

In some implementations, the system uses environment information for the dataset. The environment refers to the scenario in which data is captured.

Environment—Illumination

In one implementation, the system uses illumination as environment information. In one example, the system collects data from consensual subjects in a variety of lighting conditions, in particular focus on capturing data under dissimilar ambient lighting conditions. A non-exhaustive list of factors that could impact illumination are time of day, season, weather conditions, geographic location, scene (indoor vs outdoor).

In some implementations, the system defines the following coarse time categories alongside the required percent distribution range (in square brackets, e.g. [min-max %]): 00:00-05:59 [5%-], 06:00-11:59 [15%-], 12:00-17:59 [15%-] and 18:00-23:59 [15%-].

The system also defines the following coarse weather categories alongside the required percent distribution range (in square brackets, e.g. [min-max %]): fog [1%-], haze [1%-], snow/hail [1%-], rain [1%-], humid [1%-], cloud [5%-] and clear [5%-].

The system additionally defines the following coarse facial illumination categories alongside the required percent distribution range (in square brackets, e.g. [min-max %]): lighting from above the head/face [0%-], lighting from below the head/face [0%-], lighting from in front of the head/face [0%-], lighting from behind the head/face [0%-], lighting from the left of the head/face [0%-] and lighting from the right of the head/face [0%-].

In one example, the time category associated with each image should be derived from the self-reported one-hour time window of image capture.

Each image must be associated with a weather category. This must be self-reported by the subject (per image). Multiple weather category selections are permitted.

In addition, each subject's facial illumination category must be self-reported (per image). Multiple illumination category selections are permitted. Each subject's facial bounding box (per image) must be associated with their facial illumination category.

Environment—Scene

In one implementation, the system uses scene as environment information. In one example, the system collects data from consensual subjects in a variety of different scenes across different geographic locations. Maximizing diversity with respect to the scene will invariably result in, for example, subject variability, non-uniform illumination conditions, environmental occlusions, and wide variability in background clutter.

The system defines the following coarse scene categories alongside the required percent distribution range (in square brackets, e.g. [min-max %]): indoor scenes, including shopping and dining [1%-], workplace (e.g., office building, factory, lab) [1%-], home or hotel [1%-], transportation (e.g., vehicle interiors, stations) [1%-], sports and leisure [1%-] and cultural (e.g., art, education, religion, military, law, politics) [1%-]; outdoor natural and man-made scenes, including water, ice, snow [2%-], mountains, hills, desert, sky [2%-], forest, field, jungle [2%-], man-made elements [2%-], transportation (e.g., roads, parking, bridges, boats, airports) [2%-], cultural or historical building/place (e.g., military, religion) [2%-], sports fields, parks, leisure spaces [2%-], industrial and construction [2%-], houses, cabins, gardens, and farms [2%-] and commercial buildings, shops, markets, cities, and towns [2%-].

In one example, each image must be associated with a scene category and subcategory, for example, "Indoor scenes (Sports and leisure)". This must be self-reported by the subject (per image).

Environment—Camera Position

In one implementation, the system uses camera position as environment information. In one example, the system collects data from consensual subjects using a variety of different camera positions.

The system defines the following coarse camera position categories alongside the required percent distribution range (in square brackets, e.g. [min-max %]): typical position [5%-] (the camera was positioned at the eye or shoulder level of the primary subject), atypical high position [5%-] (the camera was positioned above the eye level of the primary subject; or at an elevated vantage point relative to the head of the primary subject) and atypical low position [5%-] (the camera was positioned below the eye line of the primary subject; at the hip, knee, or ground level; or at a point below the primary subject's feet).

In one example, each image must be associated with a camera position category relative to the subject designated as the primary subject. This must be self-reported (per image).

Environment—Camera Distance and Landmark Annotatability

In one implementation, the system uses camera distance and landmark annotatability as environment information. In one example, the system collects data from consensual subjects by varying the distance between the camera and the primary subject.

Camera distance is defined in terms of the length of the primary subject's facial bounding box (tightly containing their forehead, chin, and cheek) in pixels, i.e., the pixel distance from the top of their forehead to their chin. It should be noted that in what follows when the term "camera frame" is used it relates to a subject being in the frame of an image but says nothing as to the annotatability of their landmarks.

The system defines the following camera distance ("CD") categories alongside the required percent distribution range (in square brackets, e.g. [min-max %]) and their related landmark annotatability requirements: CD I [10%-], with a face height is in the range 10-49 pixels, CD II [10%-], with a face height is in the range 50-299 pixels, CD III [10%-], with a face height is 300-899 pixels, CD IV [10%-], with a face height is 900-1499 pixels and CD V [10%-], with a face height is 1500+ pixels.

In one implementation, each type of landmark must be annotatable in at least 10% of the delivered images. In another implementation, at least 70% of the images collected must contain (within the camera frame), but is not limited to, the primary subject's entire body, including the head, feet, and hands, as well as the entirety of any accessories and/or clothing worn on the head, face, hair, body, feet, and hands. In these images, at least 5 out of 22 body landmarks (numbered 11-32) of the primary subject must be annotatable in every image.

The remaining images must contain (within the camera frame)—as a minimum—the subject's entire head, as well as the entirety of any accessories and/or clothing worn on the head, face, and hair.

With respect to every image in the dataset, at least 3 out of 11 facial landmarks (numbered 0-10) of the primary subject must be annotatable.

In one example, each image must be associated with a camera distance category, the number of annotatable facial landmarks, and the number of annotatable body landmarks. This can be inferred from the annotated landmarks and/or annotated segmentation masks.

Nonconsensual Persons Bounding Box Annotation Review

In one implementation, for every nonconsensual subject that appears in an image, the vendor will provide either a segmentation mask of the whole nonconsensual subject or a bounding box around the nonconsensual subject. It should be noted that a segmentation mask or a bounding box should encapsulate any objects that the nonconsensual subject is holding or wearing. In general, all annotations of nonconsensual subjects must be delivered to the system through a JSON file that accompanies the corresponding image under study.

In some implementations, the vendor should provide the segmentation mask of the nonconsensual subject whenever the following criteria apply: (1) If a nonconsensual subject is "large", then the vendor should provide the segmentation mask of that nonconsensual subject; and (2) If a nonconsensual subject, or its supposed bounding box, overlaps with a consensual (primary/secondary) subject, regardless if the nonconsensual subject lies in the background or belongs to a crowd, then the vendor should provide the segmentation mask of that nonconsensual subject.

It should be noted that a segmentation mask: (1) Does not require segmentation categories; (2) Should be limited to visible regions of the nonconsensual subjects in question; and (3) May consist of disjoint polygons, if necessary.

In some implementations, the vendor should provide the bounding box encapsulating the whole nonconsensual subject whenever the following criteria apply: (1) In general, the segmentation mask is always preferred, but if a nonconsensual subject is "small", lies in the background, and does not overlap with primary/secondary subjects, then the vendor may provide the bounding box of that nonconsensual subject instead of the segmentation mask; and (2) If a set of nonconsensual subjects form a "crowd", and if this crowd is small, lies in the background and does not overlap with primary/secondary subjects, then the vendor may provide a bounding box that encapsulates all the nonconsensual subjects belonging to that crowd.

Various implementations, examples, data management, and specifications have been discussed. These are examples of how implementations of the system can operate. They are not exhaustive or indicative of requirements for all implementations. For example, the focus of many examples has been upon human images, but many techniques could be applied to other living and non-living subjects, such as animals, plants, structures, or purely generated images (such as from animation) without departing from the nature of the technology.

Exemplary System

Figure 2:
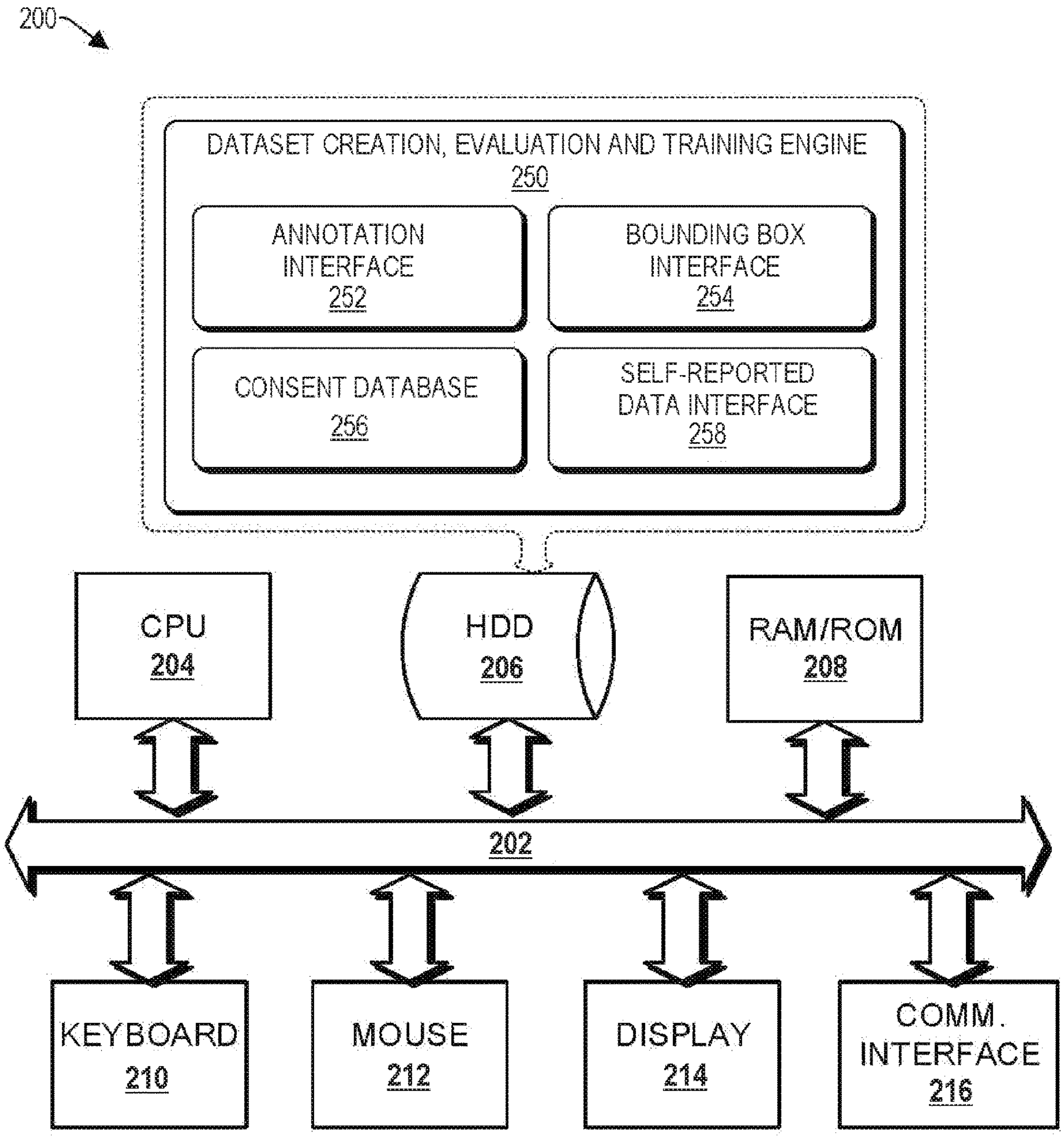
FIG. 2 provides a functional block diagram illustration of a computer hardware platform that can be used to implement a particularly configured computing device that can create and use a diverse human image dataset.

FIG. 2 provides a functional block diagram illustration of a computer hardware platform 200 that can be used to implement a particularly configured computing device that can host an image dataset creation, evaluation and training engine 250. The image dataset creation, evaluation and training engine 250, as discussed above, can include an annotation application user interfaces 252, a bounding box application interface 254, a consent database 256 and a self-reported data application interface 258 that can permit users to submit self-reported information, such as subject data, instrument data and environment data.

The computer platform 200 may include a central processing unit (CPU) 202, a hard disk drive (HDD) 204, random access memory (RAM) and/or read only memory (ROM) 206, a keyboard 208, a mouse 210, a display 212, and a communication interface 214, which are connected to a system bus 216.

In one embodiment, the HDD 204 has capabilities that include storing a program that can execute various processes, such as the dataset creation, evaluation and training engine 250, in a manner to perform the methods described herein.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A computer-implemented method for constructing a dataset of human images, comprising:

collecting a plurality of images from a plurality of diverse people, each of the plurality of diverse people being a primary subject;

providing a first graphical user interface requiring the primary subject to provide subject data, instrument data and environment data as metadata for each of the plurality of images; and storing the plurality of images as the dataset, wherein the subject data includes demographic information, physical characteristics, actions and head pose;

the plurality of images includes from 4 to 10 images of each primary subject;

each of the plurality of images per each primary subject are captured at least one day apart; and the system adjusts the storing of the plurality of images into the dataset to meet selected specifications related to diversity of the subject data, the instrument data and the environment data.

2. The computer-implemented method of claim 1, further comprising providing a second graphical user interface permitting a user to form a bounding box about a face of a subject in each of the plurality of images.

3. The computer-implemented method of claim 1, further comprising providing a third graphical user interface permitting annotators to provide annotations for each of the plurality of images.

4. The computer-implemented method of claim 1, wherein no more than 20% of the plurality of images contain subject-subject interaction annotations where the primary subject is annotated as interacting with a secondary subject.

5. The computer-implemented method of claim 1, wherein each of the plurality of images per each primary subject are taken in a different location and at a different time of day.

6. The computer-implemented method of claim 1, further comprising obtaining explicit informed consent from each of the plurality of diverse people, wherein the explicit informed consent is provided as metadata for each of the plurality of images.

7. The computer-implemented method of claim 3, wherein the annotators are demographically diverse with respect to age, pronouns and ancestry.

8. The computer-implemented method of claim 3, wherein the annotations include segmentation labels for each part of a subject's body in each of the plurality of images.

9. The computer-implemented method of claim 1, wherein the physical characteristics include age, pronouns, nationality, residence, ancestry and disability; physical characteristics including skin tone, eye color, head hair type, head hair style, head hair color, facial hair style, facial hair color, height, weight, and facial marks.

10. The computer-implemented method of claim 1, wherein the actions include body pose, subject-object interaction and subject-subject interaction.

11. The computer-implemented method of claim 1, wherein the environment data includes illumination, scene, camera position and camera distance.

12. The computer-implemented method of claim 1, further comprising providing an output illustrating the diversity of the dataset with respect to each of the subject data, the instrument data and the environment data.

13. A computer-implemented method for training or evaluating commercial machine learning or artificial intelligence systems in an unconstrained setting, the method comprising:
- creating a diverse dataset of human images by:
  - collecting a plurality of images from a plurality of diverse people each of the plurality of diverse people being a primary subject;
  - providing a first graphical user interface requiring the primary subject to provide subject data, instrument data and environment data as metadata for each of the plurality of images;
  - providing a second graphical user interface requiring a user to form a bounding box about a face of a subject in each of the plurality of images;
  - providing a third graphical user interface requiring annotators to provide annotations for each of the plurality of images; and
  - storing the plurality of images as the dataset; and
- training or evaluating the machine learning or artificial intelligence system by using the diverse dataset in the machine learning or artificial intelligence system, wherein:
- the plurality of images includes from 4 to 10 images of each primary subject;
- each of the plurality of images per each primary subject are captured at least one day apart;
- at least 50% of the plurality of images per each primary subject are captured at least seven days apart; and
- the system adjusts the storing of the plurality of images into the dataset to meet selected specifications related to diversity of the subject data, the instrument data and the environment data.

14. The computer-implemented method of claim 13, wherein the machine learning or artificial intelligence system is operable for one or more of body and face detection, body and face landmark detection, body and face parsing, face alignment, face recognition, face verification, image editing and image synthesis.

15. The computer-implemented method of claim 13, wherein:
- no more than 20% of the plurality of images contain subject-subject interaction annotations where the primary subject is annotated as interacting with a secondary subject; and
- each of the plurality of images per each primary subject are taken in a different location and at a different time of day.

16. The computer-implemented method of claim 13, further comprising obtaining explicit informed consent from each of the plurality of diverse people, wherein the explicit informed consent is provided as metadata for each of the plurality of images.

17. The computer-implemented method of claim 13, wherein the annotators are demographically diverse with respect to age, pronouns and ancestry.

18. The computer-implemented method of claim 13, wherein:
- the subject data includes demographic information, physical characteristics, actions and head pose;
- the physical characteristics include age, pronouns, nationality, residence, ancestry and disability; physical characteristics including skin tone, eye color, head hair type, head hair style, head hair color, facial hair style, facial hair color, height, weight, and facial marks;
- the actions include body pose, subject-object interaction and subject-subject interaction; and
- the environment data includes illumination, scene, camera position and camera distance.

19. A computer-implemented method for constructing a dataset of human images, comprising:
- collecting a plurality of images from a plurality of diverse people, each of the plurality of diverse people being a primary subject;
- providing a first graphical user interface requiring the primary subject to provide subject data, instrument data and environment data as metadata for each of the plurality of images;
- providing a second graphical user interface requiring a user to form a bounding box about a face of a subject in each of the plurality of images;
- providing a third graphical user interface requiring annotators to provide annotations for each of the plurality of images; and
- storing the plurality of images as the dataset, wherein:
- the subject data includes demographic information, physical characteristics, actions and head pose;
- the plurality of images includes from 4 to 10 images of each primary subject;
- each of the plurality of images per each primary subject are captured at least one day apart; and the system adjusts the storing of the plurality of images into the dataset to meet selected specifications related to diversity of the subject data, the instrument data and the environment data.

20. The computer-implemented method of claim 19, wherein:

the physical characteristics include age, pronouns, nationality, residence, ancestry and disability; physical characteristics including skin tone, eye color, head hair type, head hair style, head hair color, facial hair style, facial hair color, height, weight, and facial marks;

the actions include body pose, subject-object interaction and subject-subject interaction; and the environment data includes illumination, scene, camera position and camera distance.

* * * * *